United States Patent [19]
Chou

[11] Patent Number: 5,692,814
[45] Date of Patent: Dec. 2, 1997

[54] COMPUTER CASING

[76] Inventor: Shen-Chung Chou, P.O. Box 82-144, Taipei, Taiwan

[21] Appl. No.: 451,963

[22] Filed: May 26, 1995

[51] Int. Cl.⁶ .................................................. F16B 12/00
[52] U.S. Cl. ............................. 312/111; 312/265.2
[58] Field of Search ........................ 312/223.1, 223.3, 312/107, 108, 111, 257.1, 265.3, 265.2, 265.1, 265.6, 265.4

[56] References Cited

U.S. PATENT DOCUMENTS

| | | | |
|---|---|---|---|
| 5,176,435 | 1/1993 | Pipkens | 312/265.6 |
| 5,267,873 | 12/1993 | Provenzale | 312/111 |
| 5,473,845 | 12/1995 | Livingston et al. | 312/111 |
| 5,553,935 | 9/1996 | Burnham et al. | 312/265.3 |

*Primary Examiner*—James R. Brittain
*Assistant Examiner*—Geraud A. Anderson
*Attorney, Agent, or Firm*—Alfred Lei

[57] ABSTRACT

A computer casing including an upper frame having two downwardly depending legs one at a side thereof, a lower frame having two upwardly extending lugs one at a side thereof, a front frame secured between front ends of the upper frame and the lower frame, a rear frame fitted between rear ends of the upper frame and the lower frame, an upper board adapted to engage with a top of the upper frame, and a pair of side covers each engaged with one side of the casing, whereby a plurality of similar computer casings can be conveniently connected together so as to allow for an expansion of its internal space to be readily accommodated.

5 Claims, 15 Drawing Sheets

COMPUTER CASING

BACKGROUND OF THE INVENTION

1. Field of the Invention

This invention relates to a computer casing which can be easily connected with similar casings.

2. Description of the Prior Art

It has been found that the conventional computer casing is simply a housing with a fixed capacity. Hence, when expansion of the computer becomes necessary, this will cause major problems if such expansion is not able to be accommodated within the existing wall frames.

Therefore, it is an object of the present invention to provide a computer casing which can obviate and mitigate the above-mentioned drawbacks.

SUMMARY OF THE INVENTION

This invention relates to a computer casing.

It is the primary object of the present invention to provide a computer casing which allows for an expansion of its internal space to be readily accommodated.

It is another object of the present invention to provide a computer casing which can be easily connected with similar casings.

It is still another object of the present invention to provide a computer casing which can be connected with a loudspeaker at both sides.

It is still another object of the present invention to provide a computer casing which is convenient to use.

It is a further another object of the present invention to provide a computer casing which is facile to manufacture.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIGS. 1, 1A, 1B, 1C and 1D thereof, the computer casing according to the present invention comprises an upper frame 1, a lower frame 2, a front frame 3, a rear frame 4, an upper board 9, two side boards 5, a front panel 6, and two loudspeakers 7.

The upper frame 1 is a rectangular member open at the central portion and provided with two hooks 13 at the top. Further, the upper frame 1 is provided with two downwardly depending legs 18 one at a side thereof. Each of the legs 18 has a hook 11 and a hole 12 at both ends.

The lower frame 2 is also a rectangular member having the size as the upper frame. The lower frame 2 has two upwardly extending lugs 21 one at a side thereof. Each of the lugs 21 is provided with a hook 22 and a hole 23. In addition, the bottom side of the lower frame 2 is formed with two holes (not shown) adapted to engage with the hooks 13 of the upper frame 1 of another similar computer casing.

The front frame 3 is generally rectangular in shape and arranged between the front sides of the upper frame 1 and the lower frame 2.

The rear frame 4 has the same size as the front frame 3 and fitted between the rear sides of the upper frame 1 and the lower frame 2.

The upper board 9 is secured on the top of the upper frame 1 by any appropriate means.

The side cover 5 is provided with two hooks 51 and openings 52 at its upper and lower edges which are adapted to engage with the openings 12 and hooks 11 of the upper frame 1 and the lower frame 2.

Figure 6:
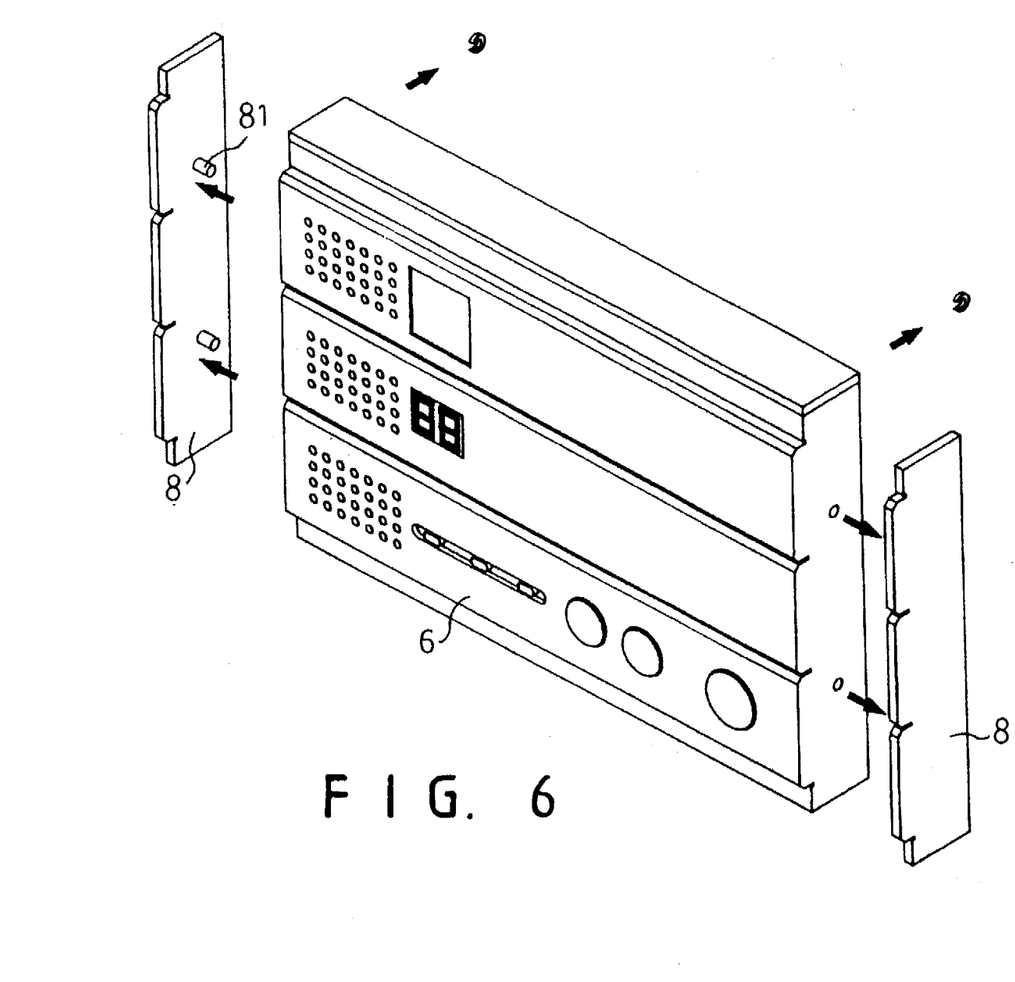
FIG. 6 illustrates how to connect two side plates with a front panel.
Figure 6A:
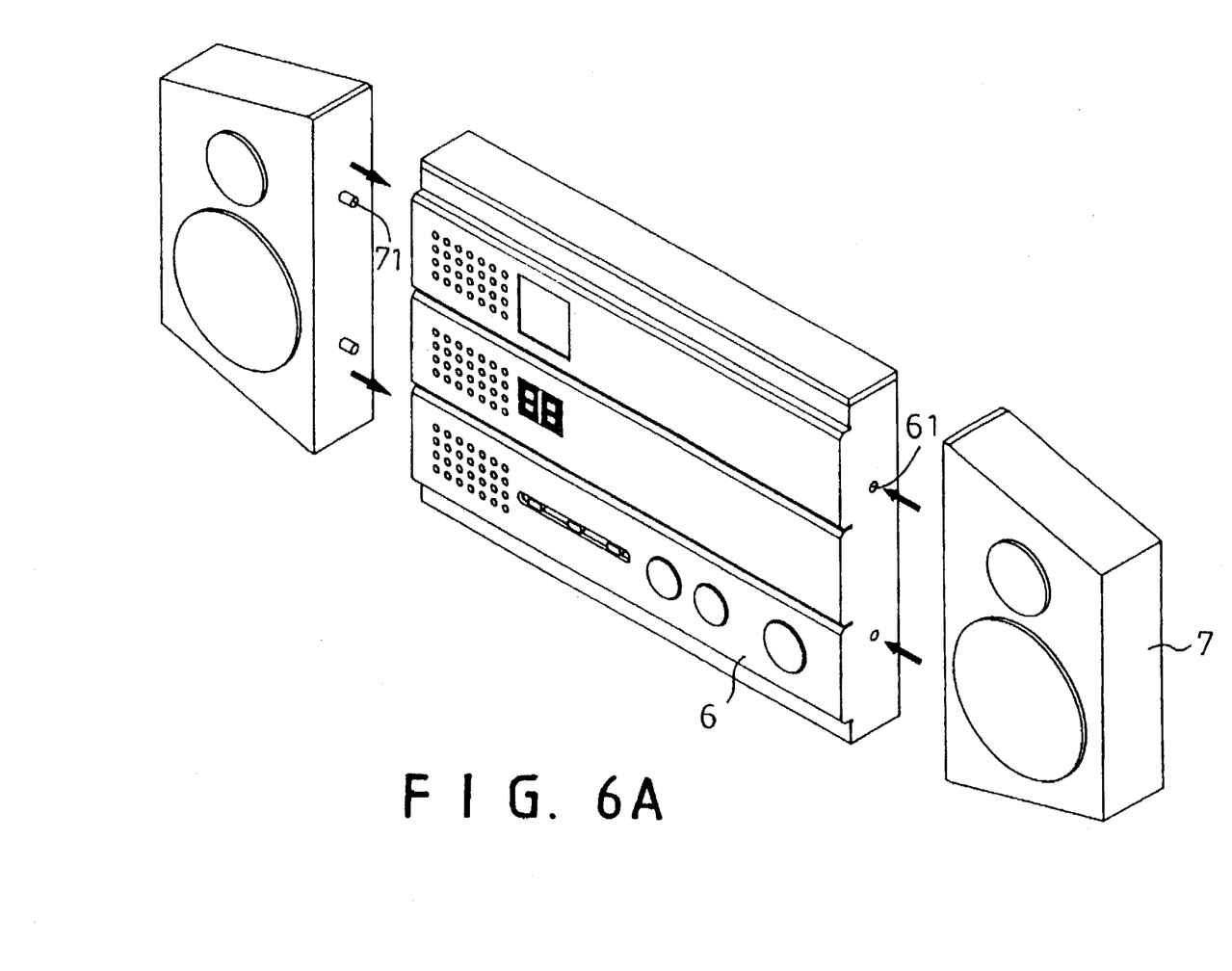
FIG. 6A illustrates how to connect two loudspeakers with a front panel.
Figure 6B:
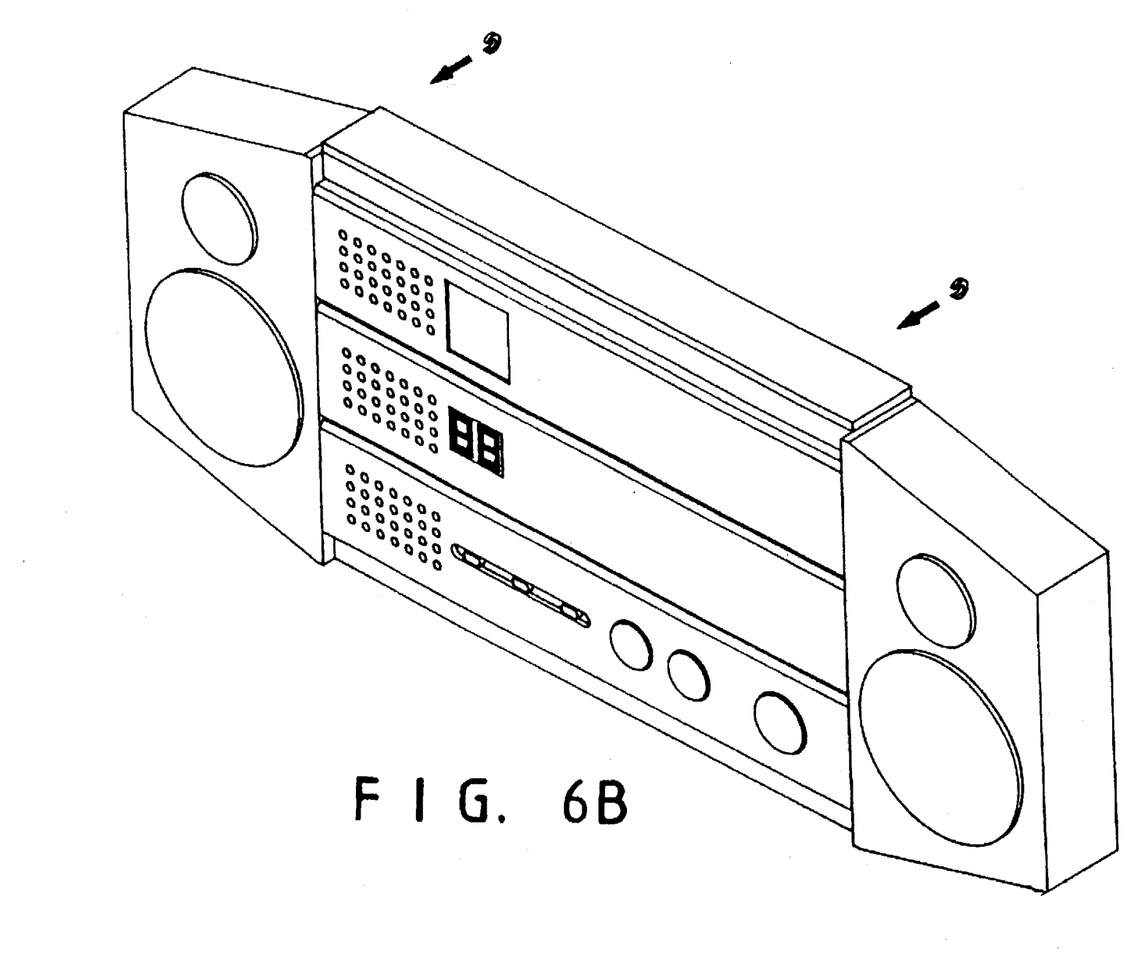
FIG. 6B is a perspective view of a front panel fitted with two loudspeakers.

The front panel 6 is mounted on the front frame 3 and cannot be connected with other similar panels 6 by any suitable fastening means (see FIGS. 5, 5A, 5B, 5C, 5D, and frame 1 and the lower frame 2. Both ends of the front panel 6 are provided with a plurality of perforations 61 adapted to engage with protuberances 81 of a side plate 8 (see FIGS. 6, 6A and 6B). Further, the perforations 61 provided at both sides of the front panel 6 are engageable with protuberances 71 of a loudspeaker 7.

Referring to FIGS. 2, 2A, 2B, 2C and 2D, two similar computer casings are horizontally connected together simply by sliding a first computer casing on a vertical side of a second computer casing so that the hooks 11 and holes 12 of the first computer casing are engaged with the holes 12 and hooks 11 of the second computer casing. Then, the legs 18 of the two computer casings are joined together by screws (shown but not numbered).

As shown in FIGS. 3, 3A, 3B, 3C and 3D, two similar computer casings are vertically connected together simply by sliding a first computer casing on a second computer casing so that the hooks 13 of the upper frame 1 of the first computer casing are engaged with the holes (not shown) of the lower frame 2 of the second computer casing. Then, the upper frame of the first computer casing is further secured to the lower frame of the first casing by screws (shown but not numbered).

Figures 1, 1A:
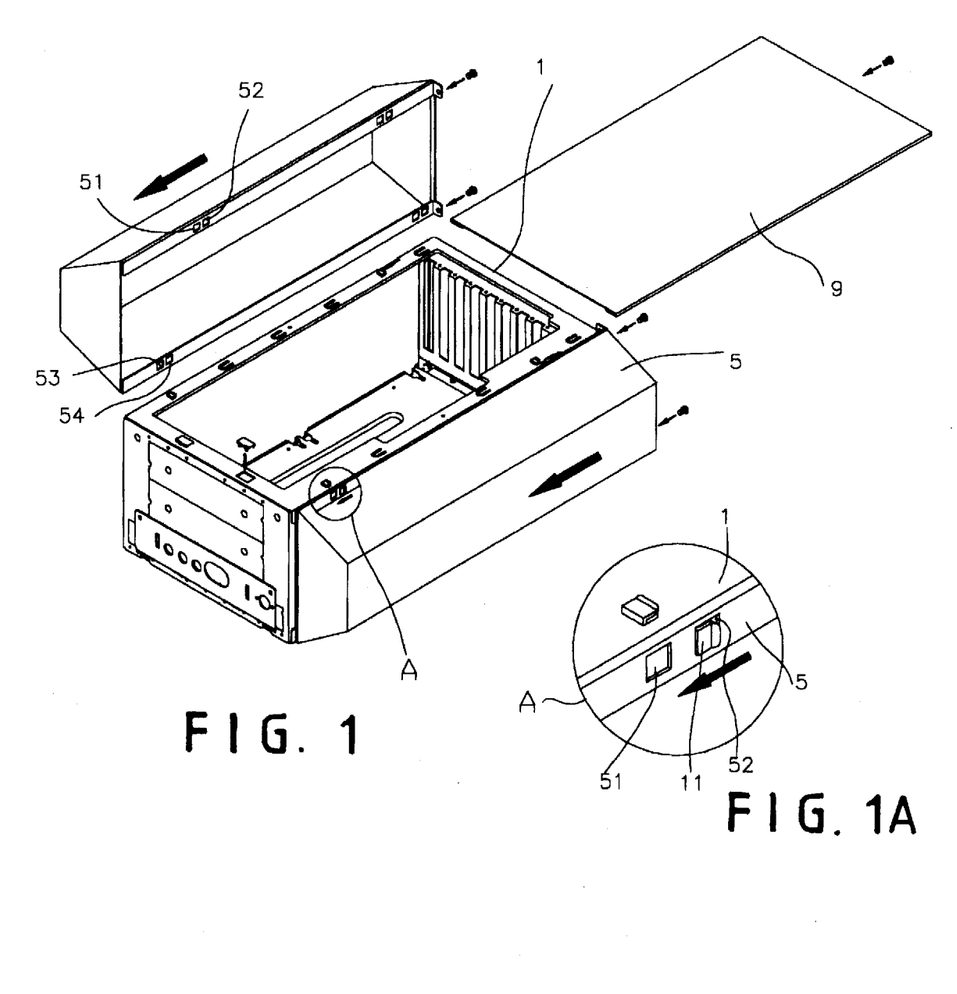
FIG. 1 is an exploded view of the present invention.
FIG. 1A is enlarged fragment view of FIG. 1.
Figure 1B:
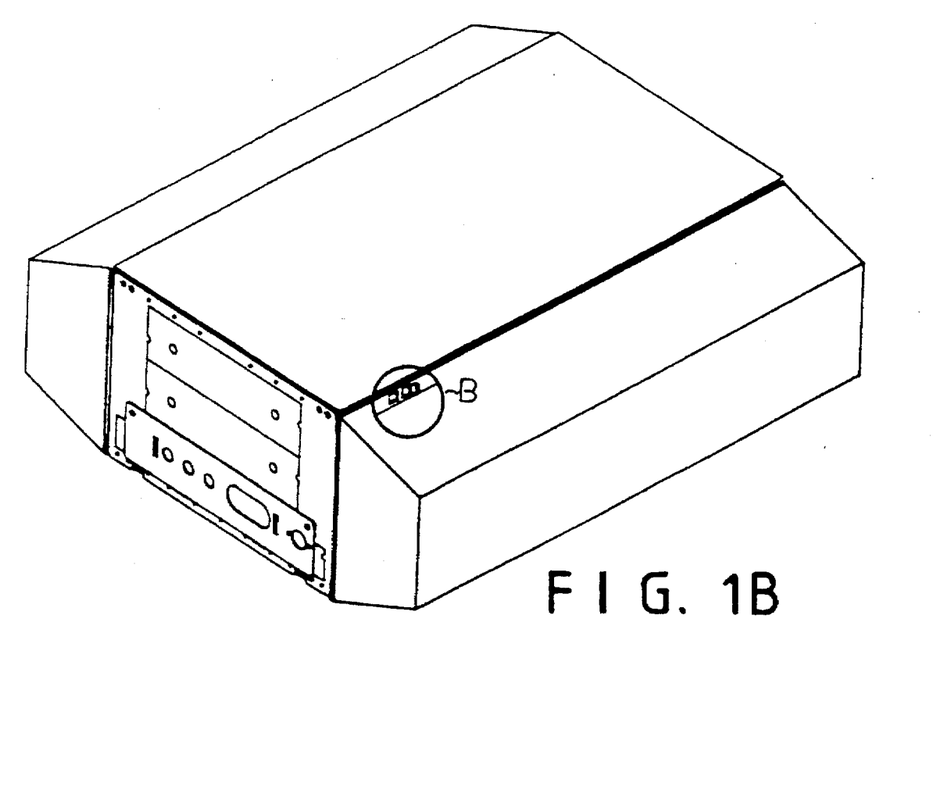
FIG. 1B is a perspective view of the present invention.
Figure 1C:
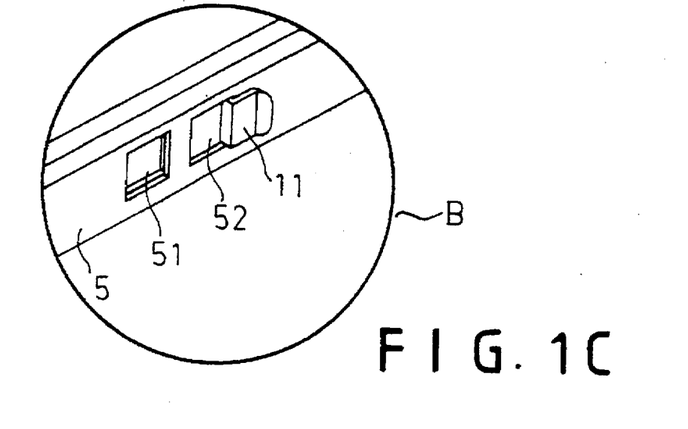
FIG. 1C is an enlarged fragmentary view of FIG. 1B.
Figure 1D:
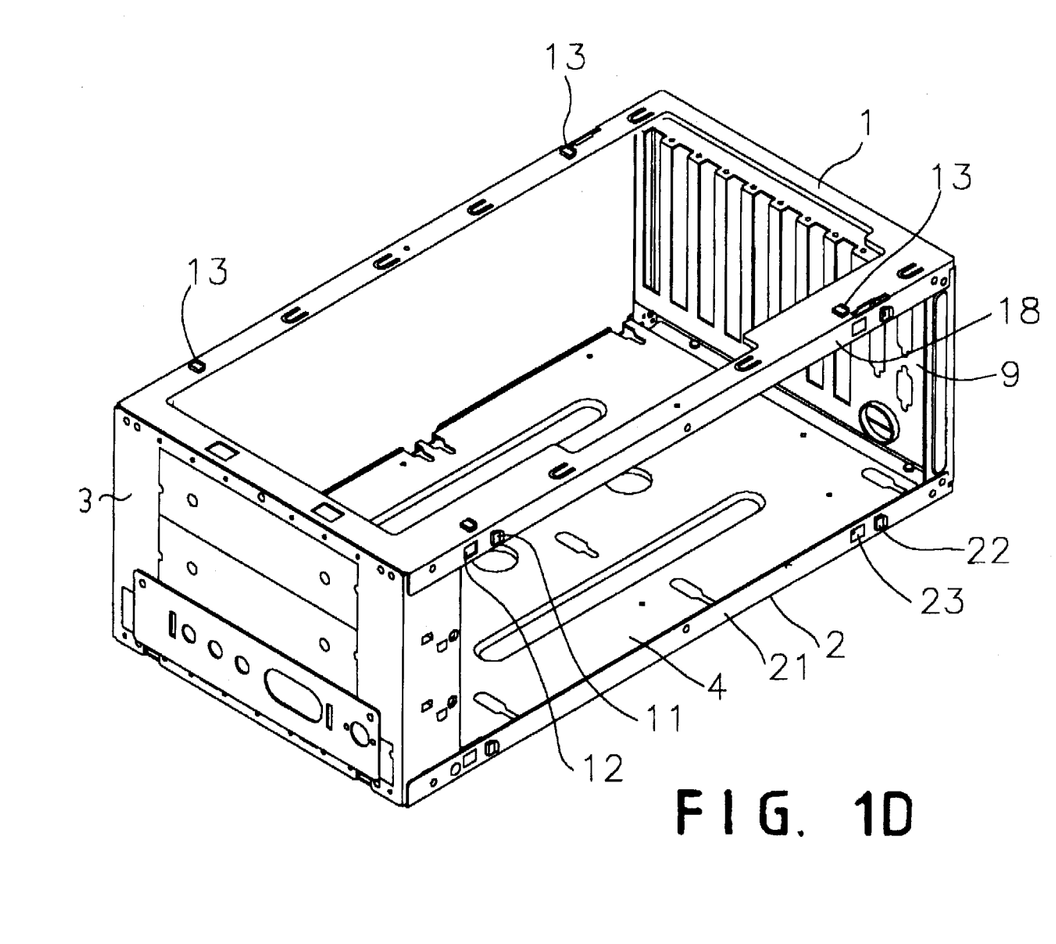
FIG. 1D is a perspective view of the present invention with the side covers and top board removed.
Figure 2:
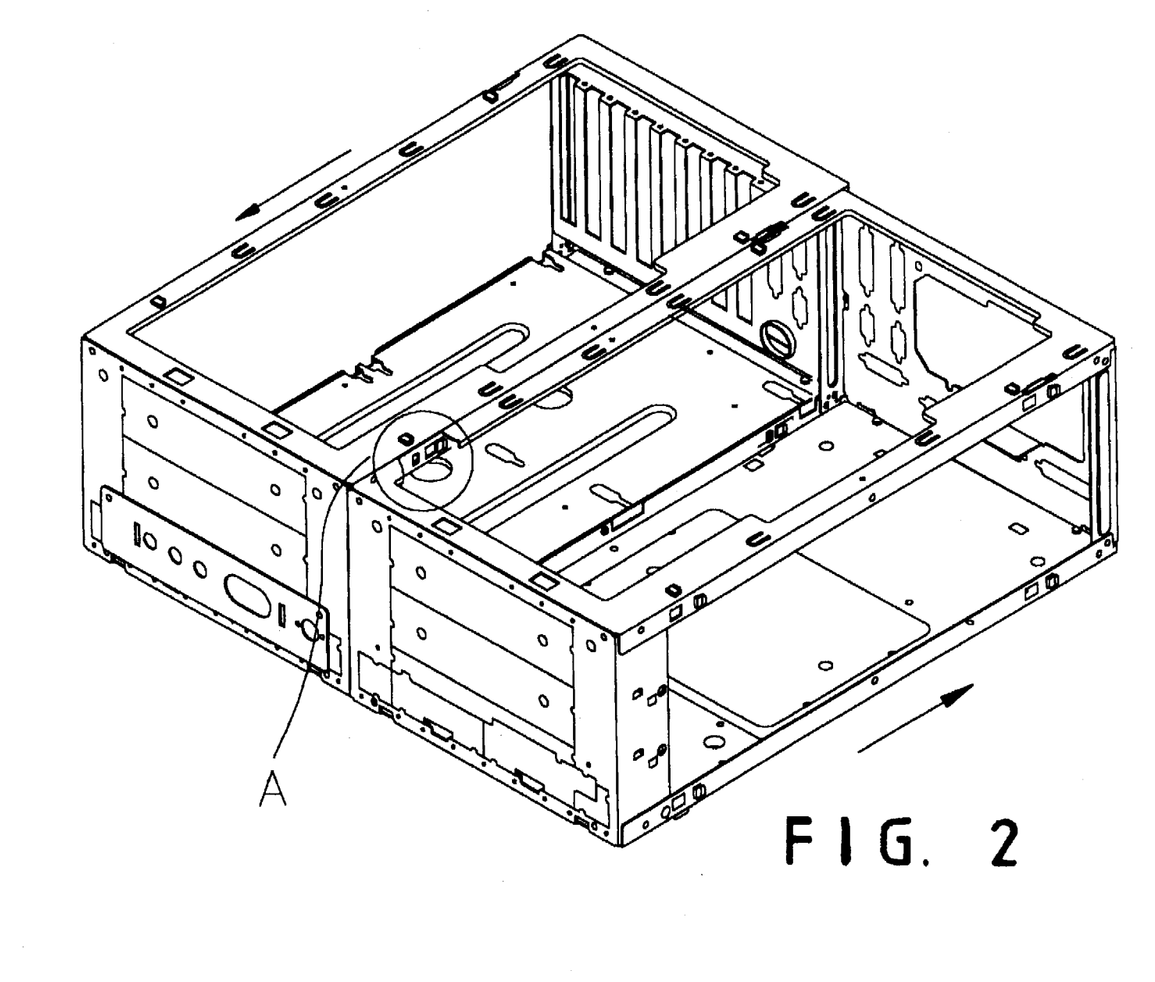
FIGS. 2 and 2A illustrate how to connect two similar computer casings horizontally.
Figure 2A:
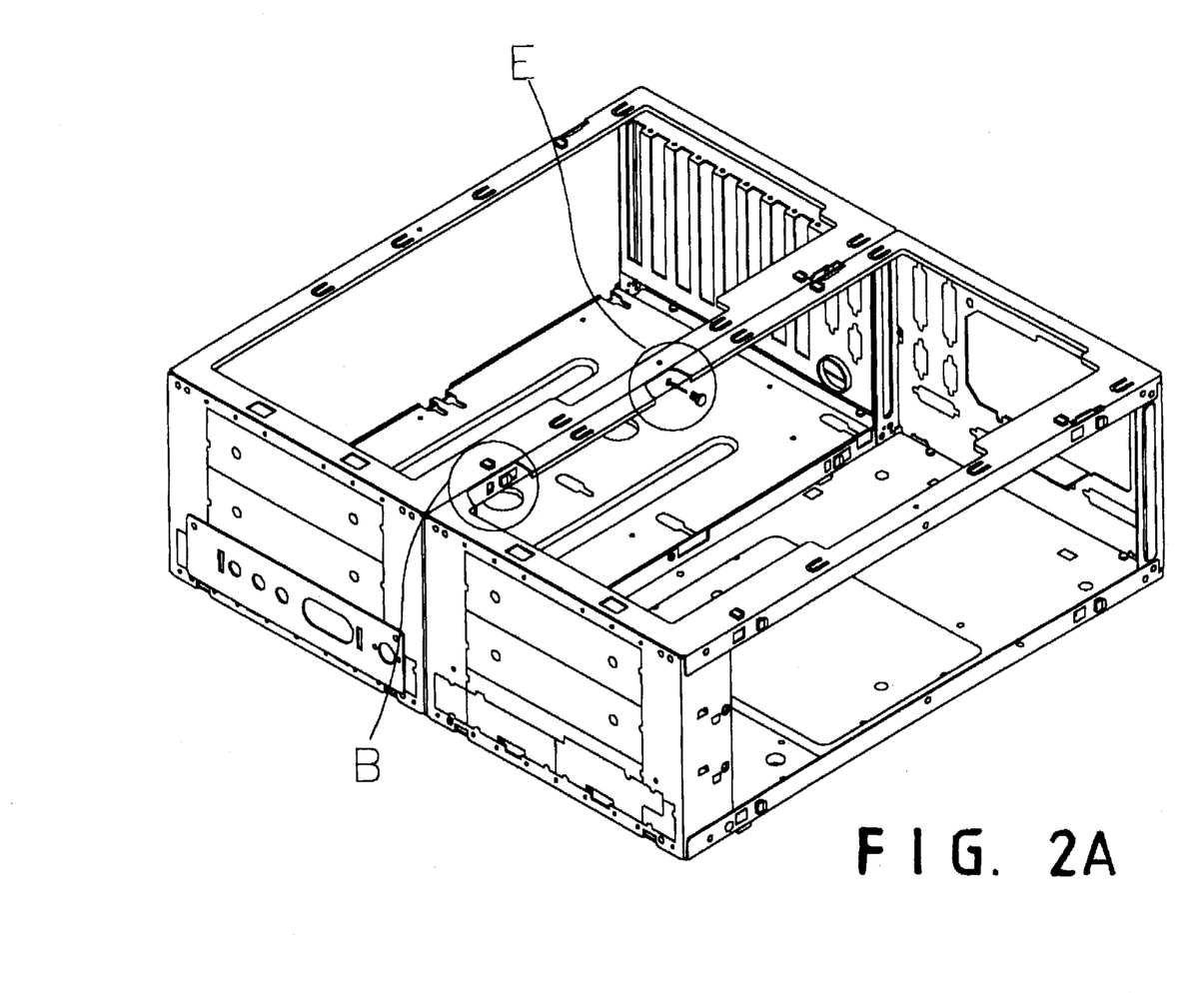
Figure 2B:
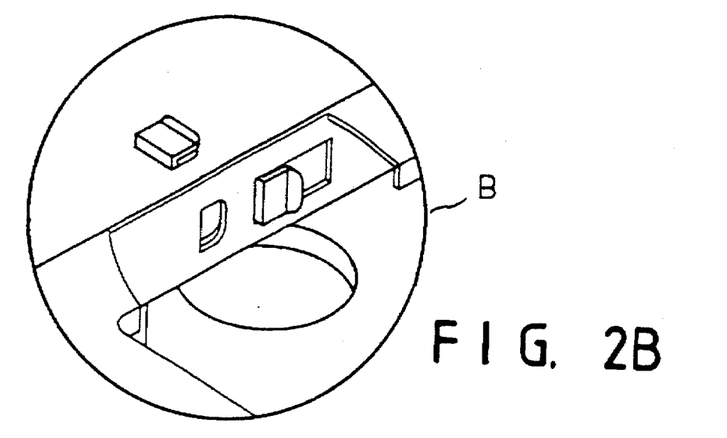
FIG. 2B is an enlarged fragmentary view of FIG. 2.
Figure 2C:
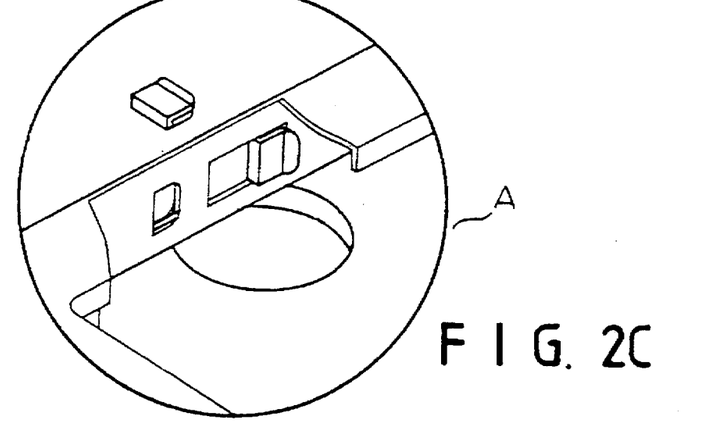
FIGS. 2C and 2D are enlarged fragmentary views of FIGS. 2A.
Figure 2D:
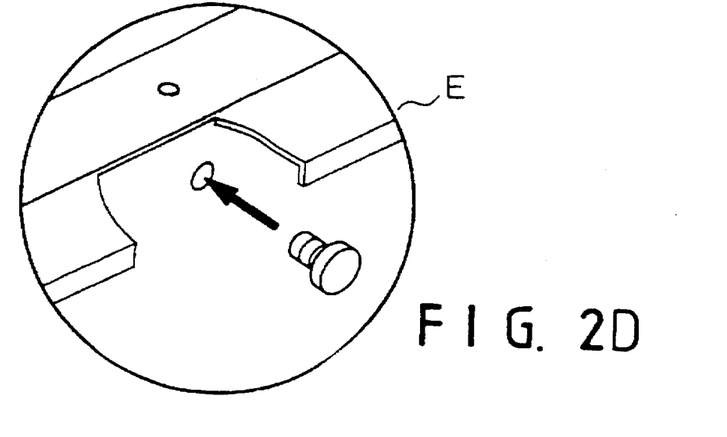
Figure 3:
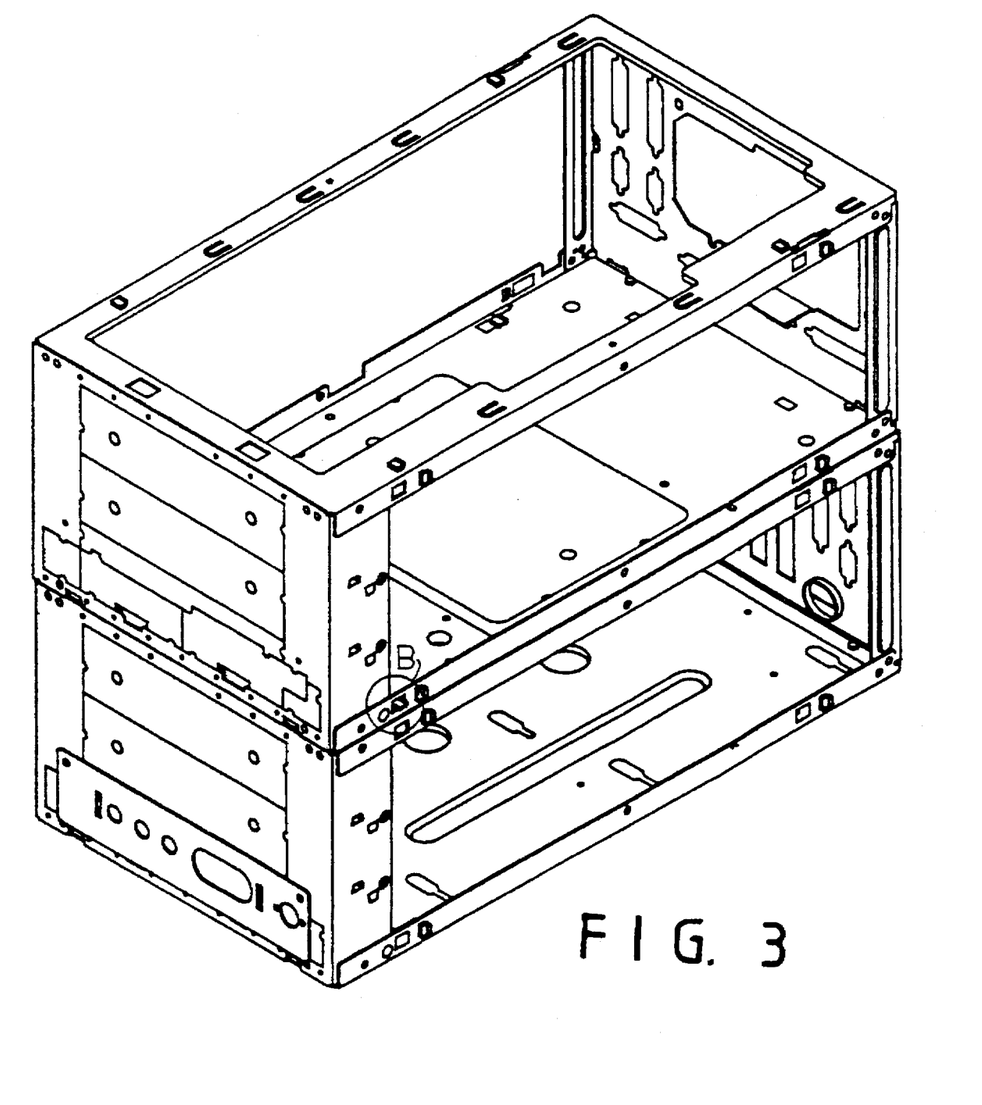
FIGS. 3 and 3A illustrate how to connect two similar computer casings vertically.
Figure 3A:
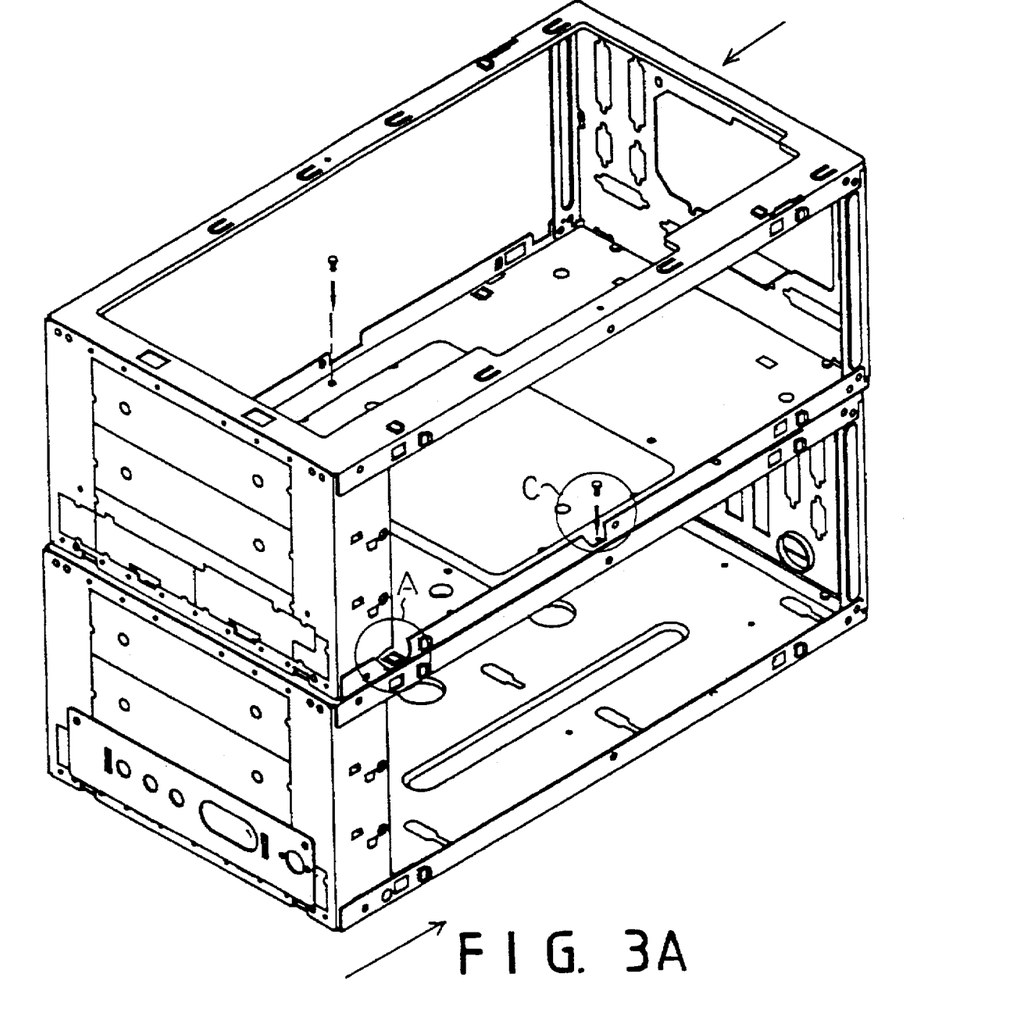
Figure 3B:
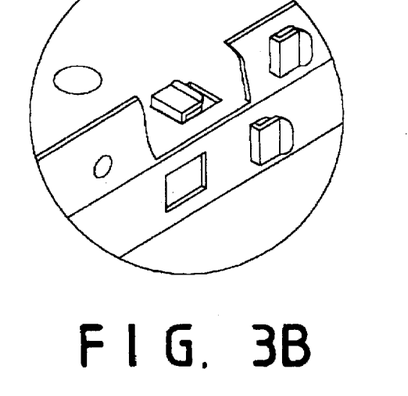
FIGS. 3B and 3C are enlarged fragmentary views of FIG. 3A.
Figure 3C:
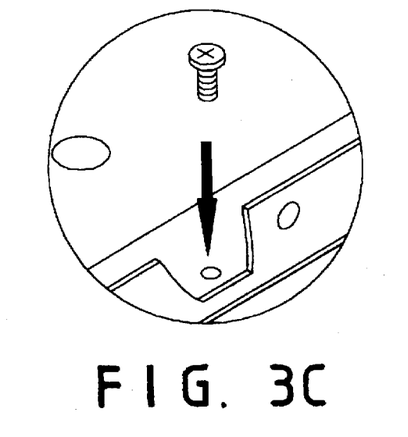
Figure 3D:
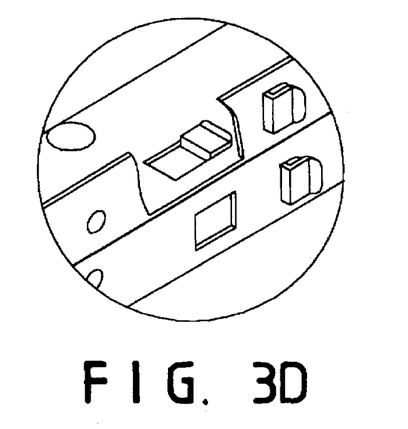
FIG. 3D is an enlarged fragmentary view of FIG. 3.
Figure 4:
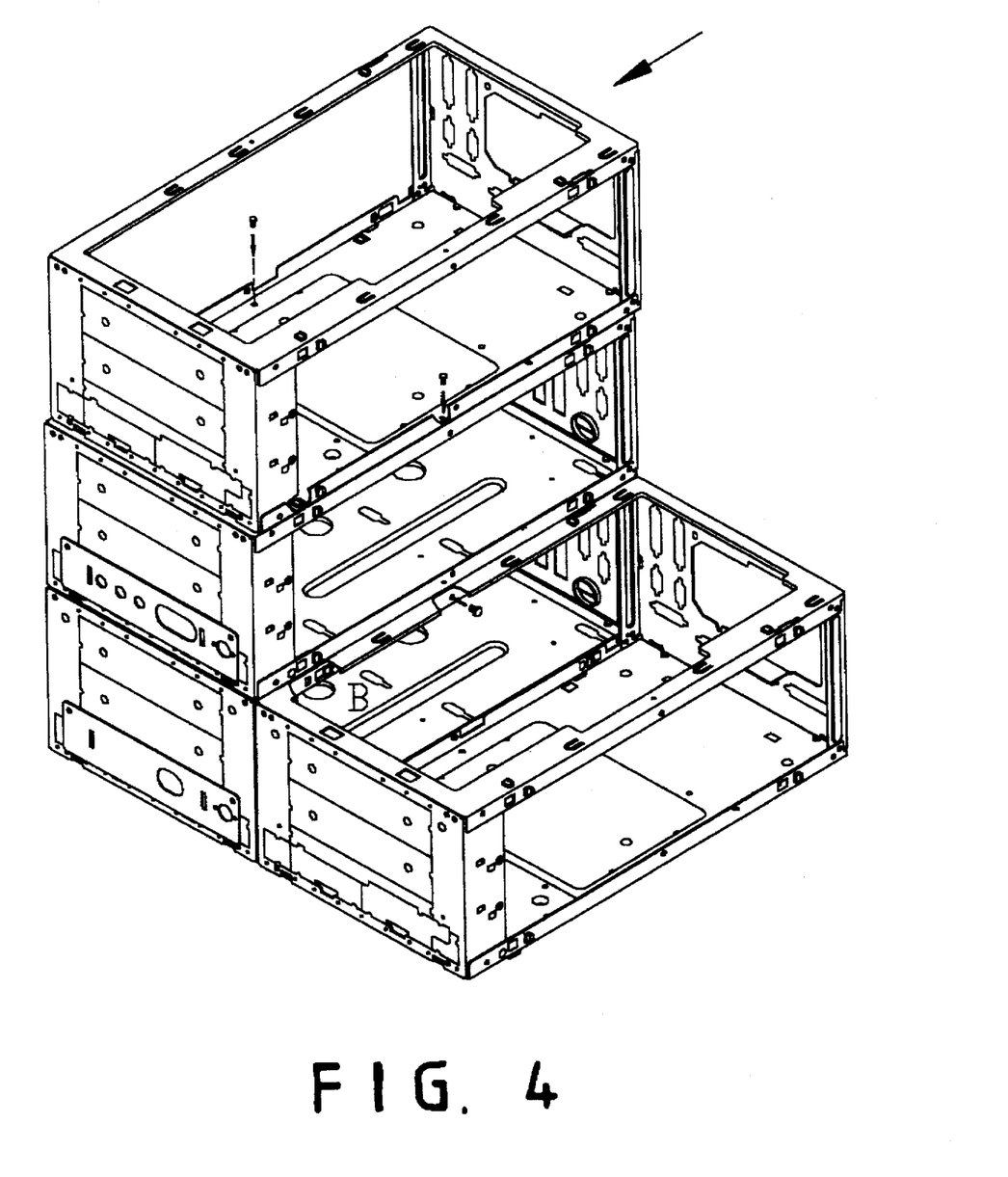
FIG. 4 illustrates how to connect similar computer casings horizontally and vertically.
Figures 5, 5A:
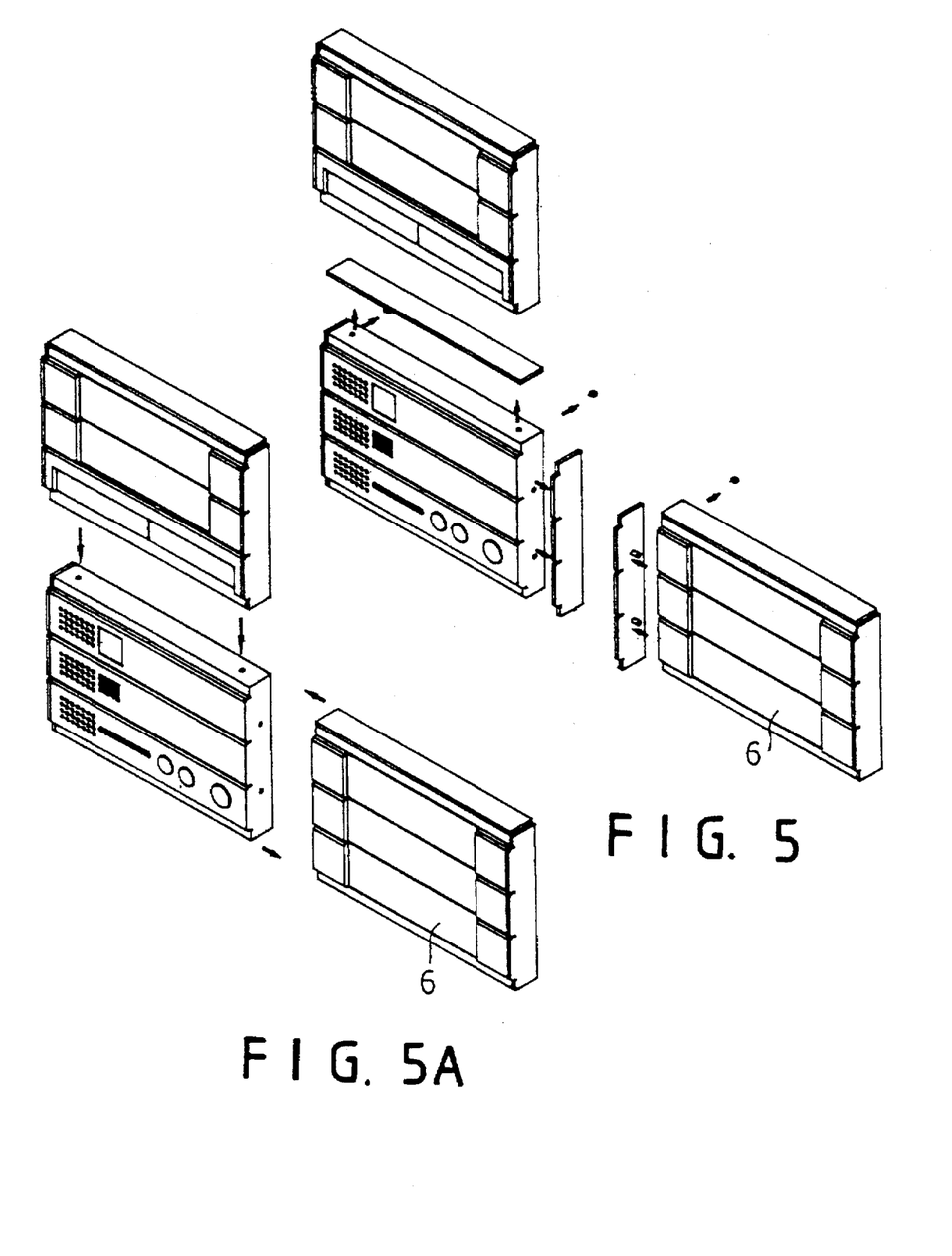
FIGS. 5, 5A, 5B and 5C show the front panels of the present invention.
Figures 5B, 5C, 5D, 5E:
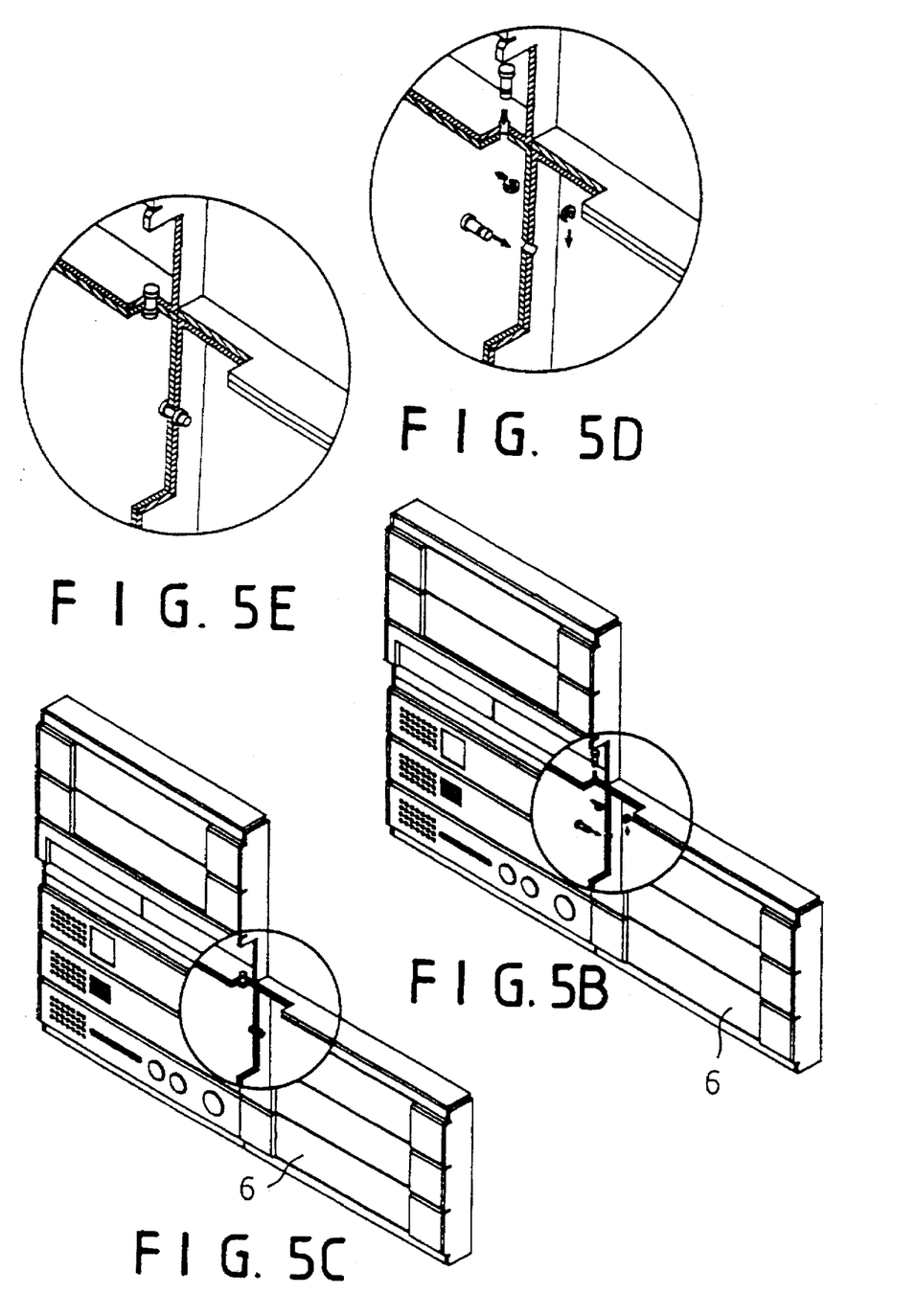
FIG. 5D is an enlarged fragmentary view of FIG. 5B.
FIG. 5E is an enlarged fragmentary view of FIG. 5C.

FIG. 4 illustrates how to connect similar computer casings horizontally and vertically.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A computer casing comprising:

an upper and lower frame each having a front end, a rear end, said upper frame having a downwardly depending leg at each of two opposite sides of said upper frame, said upper frame having a top provided with two first hooks, said legs being each provided with two second hooks extending in a direction and two first holes;

a lower frame having an upwardly extending lug at each of two opposite sides of said lower frame, said lugs being each provided with two third hooks and two second holes, said third hooks extending in said direction;

a front frame secured between said front ends of said upper frame and said lower frame;

a rear frame fitted between said rear ends of said upper frame and said lower frame;

an upper board adapted to engage with said top of said upper frame; and a pair of side covers each having two fourth hooks and two third holes removably engaging with said second hooks and said first holes of said upper frame and two fifth hooks and two fourth openings removably engaging with said third hooks and said second holes of said lower frame.

2. The computer casing as claimed in claim 1, further comprising a front panel engageable with said front frame.

3. The computer casing as claimed in claim 2, wherein said front panel is provided with a plurality of perforations at both sides of said front panel.

4. The computer casing as claimed in claim 3, further comprising two loudspeakers each having protuberances engageable with the perforations of said front panel.

5. The computer casing as claimed in claim 1, wherein said front panel is engaged with two side plates at two opposite sides of said front panel.

* * * * *